June 24, 1924.

H. PARKER

PIPE COUPLING

Filed Oct. 22, 1921

Inventor
Howard Parker
By H. Clay Lindsay
His Attorney

Patented June 24, 1924.

1,498,855

UNITED STATES PATENT OFFICE.

HOWARD PARKER, OF BERLIN, NEW HAMPSHIRE, ASSIGNOR TO BROWN COMPANY, OF BERLIN, NEW HAMPSHIRE, A CORPORATION OF MAINE.

PIPE COUPLING.

Application filed October 22, 1921. Serial No. 509,457.

*To all whom it may concern:*

Be it known that I, HOWARD PARKER, a citizen of the United States, and a resident of Berlin, county of Coos, State of New Hampshire, have invented certain new and useful Improvements in Pipe Couplings, of which the following is a specification.

This invention relates to pipe couplings, such as shown in my co-pending application Serial No. 414,400, filed October 4, 1920, and has for its object to provide against displacement of the sleeves relative to the respective pipes after the sleeves have been properly adjusted thereon, as hereinafter described more in detail.

In the accompanying drawing,—

Figure 1:
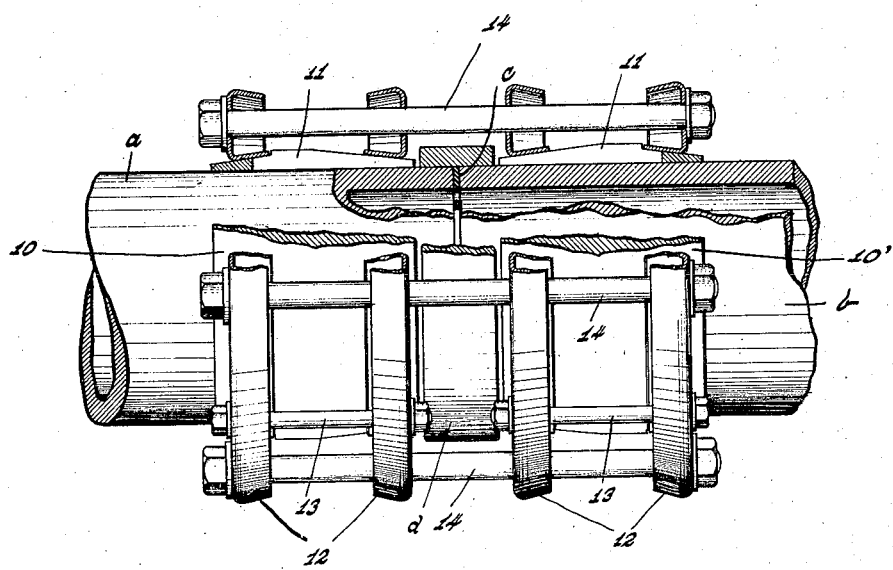
Figure 1 is a side elevation partly in section of a coupling constructed in accordance with the present invention.
Figure 3:
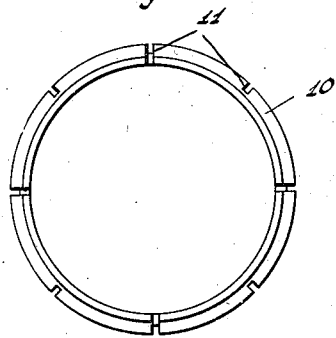
Figure 3 is an end view of said sleeve.
Figure 2:
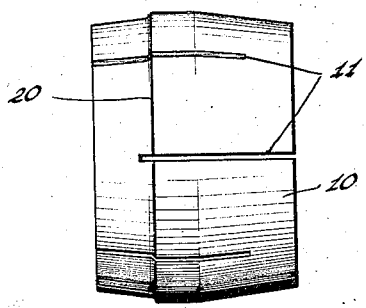
Figure 2 is a side elevation of one of the sleeves forming a part of the coupling shown in Fig. 1.

Referring to the drawings, $a$, $b$, denote the pipes or tubes which are to be connected together, and which may be formed of pulp, and $c$ is a gasket interposed between the ends of the pipes. If desired, the ends of the pipes may be telescoped into a member $d$, shown in Fig. 1, for the purpose of keeping the pipes in proper alinement. 10, 10', denote sleeves or ring-like members preferably formed of pulp and adjustable lengthwise on the respective pipes. The opposing ends of each sleeve are oppositely tapered. Extending from each end of each sleeve to within a short distance of the other end are longitudinally disposed slots 11, preferably alternately arranged. Fitting about each tapered end of each sleeve is a collar 12, the opening in which is tapered correspondingly to the tapered ends of the sleeves. These collars are connected together by bolts 13 for moving the collars towards each other and thus causing the tapered ends of the sleeves to contract and tightly grip the pipes. The sleeve 10, the collars thereabout and the bolts 13 on each pipe form a unit. These units are drawn together by rods 14. The arrangement so far described is illustrated and claimed in my said co-pending application.

In accordance with the present invention, I provide the extreme or outer end of each sleeve with a shoulder 20 against which the extreme or outside collars 12 are adapted to abut. Due to the interengagement of the outside collars against these shoulders, displacement of the adjusted sleeves on the pipes $a$, $b$, is guarded against when the tie rods 14 are tightened up to draw the two units together. In the absence of these shoulders, I have found that after the units are assembled on the respective pipes, upon tightening the nuts of the tie rods the extreme or outside collars are drawn together resulting in loosening the bolts 13 so that the effectiveness of the inner collars in clamping the sleeves against the pipes is interfered with and the result is the sleeves may slide relative to the pipes. By providing the shoulders 20, it will be seen that the extreme collars cannot be drawn towards each other without also moving the sleeves, and thus the distance between the collars on each pipe is not disturbed and the inner collar and the outer collar on each sleeve are always effective in clamping both ends of each sleeve against the respective pipes. Should it be found that the ends of the pipes were not end to end as tightly as desired, and the bushing 10 would slip if the tie rods 14 were further tightened, the short bolts 13 would first be tightened enough to stop the bushing from slipping and then, due to the shoulders on the outer ends of the sleeves, the distance between the heads and nuts of the tie rods 14 would not be materially changed when the nuts on the tie rods are tightened up to bring the ends of the pipes under the required pressure against one another.

It is, of course, obvious that my invention is susceptible of various modifications and changes, the present disclosure being by way of illustration only.

I claim as my invention:—

1. A pipe coupling for connecting a pair of pipes and comprising a contractible sleeve about each pipe, a collar fitting about each end of each sleeve, means for limiting the extent of movement of one of said collars longitudinally of each sleeve, means for drawing the collars on the opposite ends of each sleeve towards each other, and tie rods connecting the collars of the two sleeves.

2. A pipe coupling for connecting a pair of pipes and including a contractible sleeve adapted to receive a pipe, a collar fitting about each end of said sleeve, means between one of said collars and the sleeve for limiting relative movement therebetween, and means for drawing the collars on the opposite ends of said sleeve towards each other.

3. A pipe coupling for connecting a pair of pipes comprising a contractible sleeve about each pipe, each sleeve having its opposite ends oppositely tapered, a collar fitting about each end of each sleeve and one of said collars having limited movement relative to its sleeve, means for drawing the collars on each sleeve towards each other, and tie rods connecting the collars of the two sleeves.

4. A pipe coupling for connecting a pair of pipes and comprising a contractible sleeve about each pipe, each sleeve having a shoulder adjacent one end and having its other end tapered, a collar fitting about each end of each sleeve and one of said collars being adapted to abut said shoulder, means for drawing the collars of each sleeve towards each other, and tie rods connecting the extreme collars of the two sleeves.

5. A pipe coupling connecting a pair of pipes and comprising a contractible sleeve about each pipe, each sleeve being longitudinally slotted and having oppositely tapered ends one of which is provided with a shoulder, a collar fitting about each end of each sleeve with one of said collars engaging said shoulder, means for drawing the collars on each sleeve towards each other, and tie rods connecting the extreme collars.

HOWARD PARKER.